(12) United States Patent
Katou et al.

(10) Patent No.: US 7,980,518 B2
(45) Date of Patent: Jul. 19, 2011

(54) FEEDING STRUCTURE FOR SLIDING STRUCTURAL BODY

(75) Inventors: Mitsunobu Katou, Kosai (JP); Tohru Aoki, Kosai (JP); Tomoaki Nishimura, Kariya (JP); Motonari Inagaki, Aichi-ken (JP)

(73) Assignees: Yazaki Corporation, Tokyo (JP); Aisin Seiki Kabushiki Kaisha, Aichi-ken (JP)

( * ) Notice: Subject to any disclaimer, the term of this patent is extended or adjusted under 35 U.S.C. 154(b) by 184 days.

(21) Appl. No.: 12/243,418

(22) Filed: Oct. 1, 2008

(65) Prior Publication Data

US 2009/0095858 A1   Apr. 16, 2009

(30) Foreign Application Priority Data

Oct. 16, 2007   (JP) .................................. 2007-268726

(51) Int. Cl.
*F16L 3/00* (2006.01)

(52) U.S. Cl. ........................................ 248/51; 174/525

(58) Field of Classification Search ............ 248/51, 248/70, 73; 296/155, 146, 12
See application file for complete search history.

(56) References Cited

U.S. PATENT DOCUMENTS

| 6,811,404 B2 | 11/2004 | Doshita et al. |
| 2002/0005014 A1* | 1/2002 | Doshita et al. ................. 49/360 |
| 2003/0184119 A1 | 10/2003 | Doshita et al. |
| 2008/0035800 A1* | 2/2008 | Yamamoto ..................... 248/70 |

FOREIGN PATENT DOCUMENTS

| JP | 2001-122054 A | 5/2001 |
| JP | 2001-151042 A | 6/2001 |
| JP | 2001-197649 A | 7/2001 |
| JP | 2001-260770 A | 9/2001 |
| JP | 2002-17032 A | 1/2002 |
| JP | 2003-32868 A | 1/2003 |
| JP | 2003-32869 A | 1/2003 |
| JP | 2004-136735 A | 5/2004 |
| JP | 2006-27372 A | 2/2006 |

OTHER PUBLICATIONS

Chinese Office Action, dated Dec. 8, 2010, issued in Application No. 200810170269.9.

* cited by examiner

*Primary Examiner* — Amy J Sterling
*Assistant Examiner* — Erin Smith
(74) *Attorney, Agent, or Firm* — Sughrue Mion, PLLC (57) ABSTRACT

A feeding structure for a sliding structural body includes: a protector base arranged in one of the sliding structural body and a stationary structural body; a link arm pivotally supported by a shaft portion of the protector base; a harness holder pivotally connected to an end portion of the link arm; and a wire harness which is laid from one end of the protector base to the harness holder so as to be bent in a substantial S-shape, and laid from the harness holder to the other of the sliding structural body and the stationary structural body so as to be moved therebetween.

9 Claims, 6 Drawing Sheets

FEEDING STRUCTURE FOR SLIDING STRUCTURAL BODY

BACKGROUND OF THE INVENTION

1. Technical Field

The present invention relates to a feeding structure for a sliding structural body in which a redundant length of a wire harness is absorbed by a link arm pivotally arranged on a protector base.

2. Background Art

Figure 4:
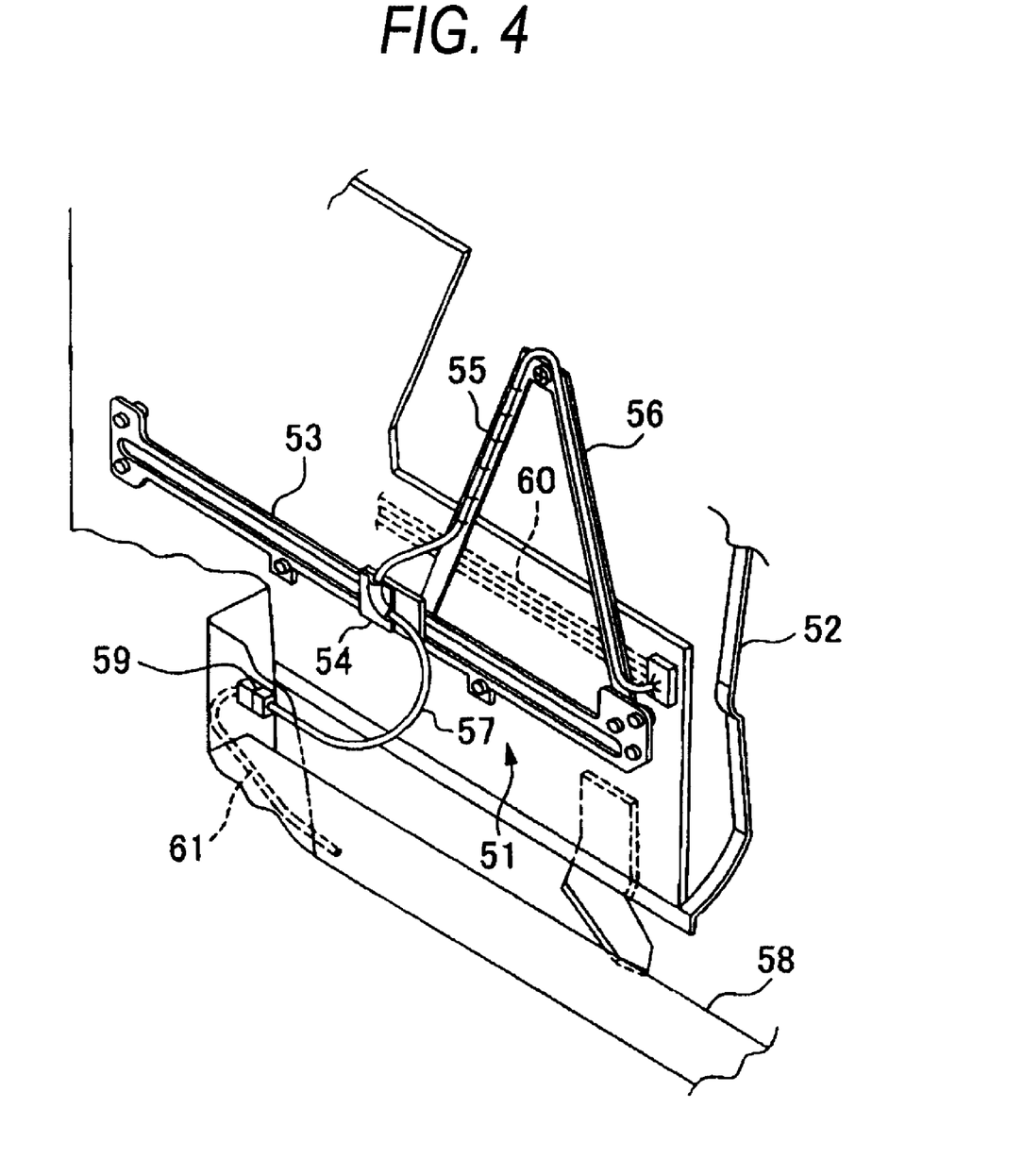
FIG. 4 is a perspective view showing a first configuration of the feeding structure for a sliding structural body of the related art.

FIG. 4 is a view showing a first configuration of the conventional feeding structure for a sliding structural body. Concerning this matter, refer to Patent Document 1.

This feeding structure adopts a feeding unit 51. The feeding unit 51 includes: a guide rail 53 horizontally arranged in the slide door 52 of an automobile; a slider 54 slidably engaged with the guide rail 53; and a pair of V-shaped links 55, 56, which can be freely opened and closed, and one end portion of the link 55 is connected to the slider 54 and the one end of the link 56 is connected to the guide rail 53.

The wire harness 57 is laid from the link 55 to the stationary portion 59 on the vehicle body side 58 through the slider 54 while the wire harness 57 is being bent into a substantial U-shape. One end of the wire harness 57 is connected to the wire harness 60 on the sliding door side by a connector and the other end of the wire harness 57 is connected to the wire harness 61 on the vehicle body side by a connector.

When the slide door 52 is opened and closed, the pair of links 55, 56 are opened and closed (extended and contracted). Therefore, while the slider 54 is relatively moving along the guide rail 53, it is located in the neighborhood of the stationary portion 59 on the vehicle body side at all times.

Figure 5:
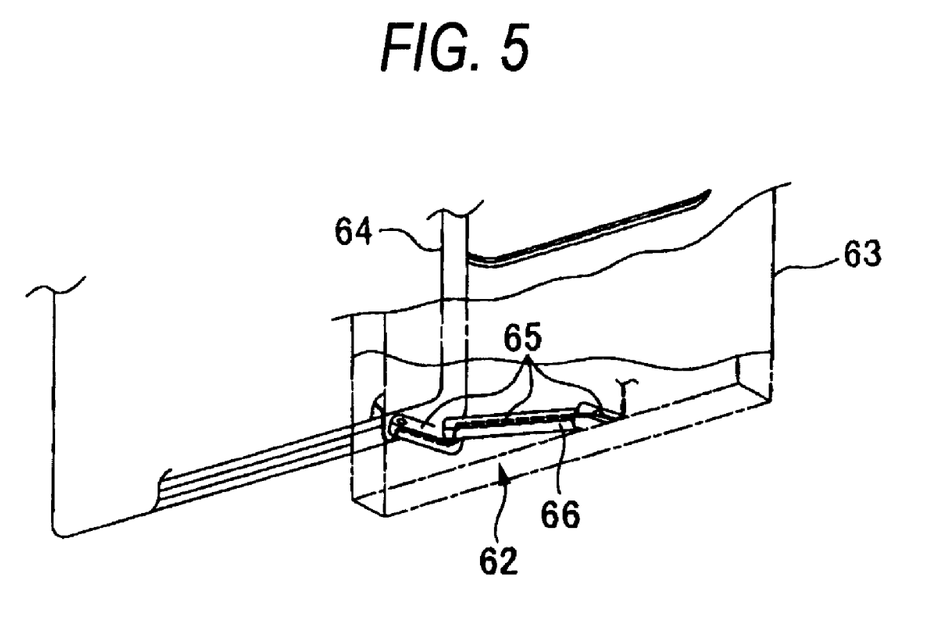
FIG. 5 is a perspective view showing a second configuration of the feeding structure for a sliding structural body of the related art.

FIG. 5 is a view showing a second configuration of the conventional feeding structure for a sliding structural body. Concerning this matter, refer to Patent Document 2.

This feeding structure adopts a feeding unit 62 in which three long and short links 65 are connected between the slide door 63 and the vehicle body 64 of an automobile being capable of freely moving in the horizontal direction. The wire harness 66 is laid from the vehicle body 64 to the slide door 63 along the links 65.

When the slide door 63 is opened and closed, the links 65 are rotated in the opposing direction so as to cope with the movement of the slide door 63.

Figure 6A:
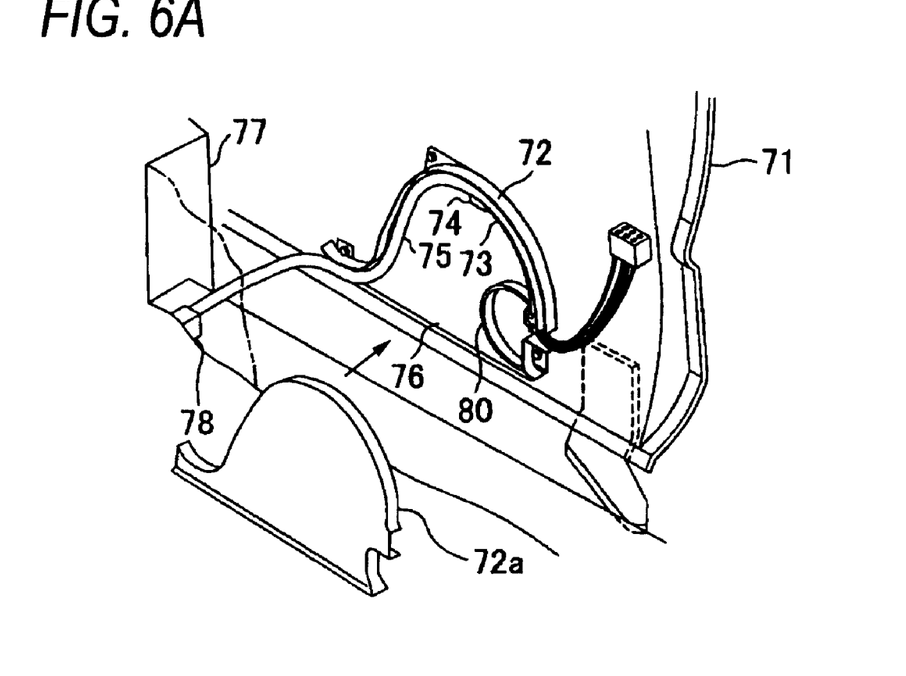
FIG. 6A is a perspective view showing a state in which the slide door is near at the completely closed condition in a third configuration of the feeding structure for a sliding structural body of the related art.
Figure 6B:
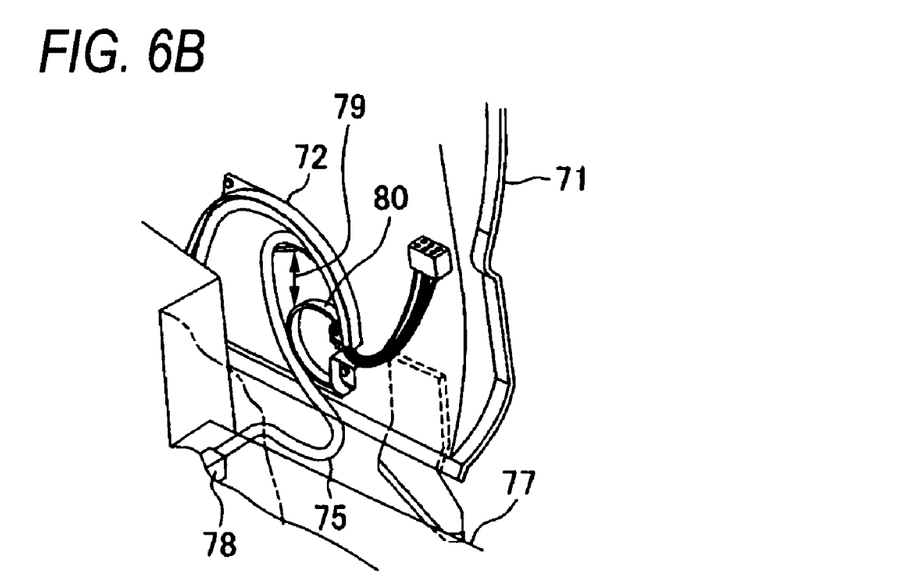
FIG. 6B is a perspective view showing a state in which the slide door is near at the completely opened condition in a third configuration of the feeding structure for a sliding structural body of the related art.

FIGS. 6A and 6B are views showing a third configuration of the conventional feeding structure for a sliding structural body. Concerning this matter, refer to Patent Document 3.

This feeding structure is composed as follows. A protector 72 made of synthetic resin is arranged in a slide door 71 of an automobile. A leaf spring 73 is arranged in the protector 72. A cap 74 made of synthetic resin is inserted and fixed to a forward end portion of the leaf spring 73. A wire harness 75 is supported by the cap 74 being pushed upward. One side of the wire harness 75 is laid on the slide door 71 side and the other side of the wire harness 75 is laid from the laterally long lower opening 76 of the protector 71 to a harness fixture 78 on a vehicle body 77 side. Hanging of the wire harness 75, which is caused when the slide door 71 is half opened, is prevented by a pushing force of the leaf spring 73. The protector 72 includes: a protector base (substituted by the reference numeral 72) and a protector cover 72a.

FIG. 6A is a view showing a state in which the slide door 71 is near at the completely closed condition and FIG. 6B is a view showing a state in which the slide door 71 is near at the completely opened condition. When the slide door 71 is completely closed, the slide door 71 is tightly contacted with the vehicle body 77 side and the wire harness 75 is pulled backward at the fulcrum of the wire harness fixing fixture 78. When the slide door 71 is completely opened, while the wire harness 75 is being pulled forward at the fulcrum of the wire harness fixing fixture 78, a diameter of the wire harness 75 is reduced and the minimum radius of curvature of bend of the leaf spring 73 and the wire harness 75 is ensured by an annular wall 80 in the protector.

[Patent Document 1] JP-A-2001-122054 (FIG. 1)
[Patent Document 2] JP-A-2001-151042
[Patent Document 3] JP-A-2004-136735 (FIGS. 6 and 7)

However, in the first feeding structure of the related art shown in FIG. 4, the following problems may be encountered. Since the long guide rail 53 and the links 55, 56 are arranged, the number and the weight of parts are increased and the parts occupies a large space in the slide door 52. Further, the wire harness 57 is bent at a small diameter in a crossing portion in which the wire harness 57 crosses the slider portion 54 or the links 55, 56, which increases bending stress and deteriorates the durability of the wire harness. In the second feeding structure of the related art shown in FIG. 5, the following problems may be encountered. Simultaneously when the links 65 are rotated, the wire harness 66 is complicatedly bent at a small diameter, which deteriorates the durability of the wire harness 66.

In the third feeding structure of the related art shown in FIG. 6, the following problems may be encountered. It is necessary to provide a space in the protector 72, into which pull-up space 79 of the wire harness 75 is accommodated, and it is also necessary to provide a space in the protector 72, in which the annular wall 80 for regulating the minimum radius of curvature of bend of the leaf spring 73 is accommodated. Accordingly, dimensions of the protector 72 tend to increase and the protector 72 occupies a large area inside the slide door 71. Therefore, the degree of freedom of arranging the other auxiliary devices may be restricted and alternatively, it may become difficult to absorb a redundant length of the wire harness in case that the priority of using the space is given to the arrangement of the other auxiliary devices. Further, it becomes necessary to use a long wire harness (a long corrugated tube and electric wire) 75 to be laid in the large protector. Accordingly, in order to insert the electric wire into the corrugated tube, it takes much labor. Further, the manufacturing cost is raised and the weight is increased.

The above problems are caused in the same manner not only in the case where the feeding unit is applied to the slide door of an automobile but also in the case where the feeding unit is applied to the sliding structural body such as a slide door of a train or a slide door of a manufacturing apparatus or a detection apparatus. In these cases, the vehicle body and the apparatus body are referred to as stationary structural bodies.

SUMMARY OF THE INVENTION

In view of the above points, an object of the present invention is to provide a feeding structure for a sliding structural body capable of solving problems of increase in size of a protector and a wire harness so that an installation space can be saved and also capable of decreasing bending stress given to a wire harness so that the durability can be enhanced.

In order to accomplish the above object, there is provided a feeding structure for a sliding structural body, including: a protector base arranged in one of the sliding structural body and a stationary structural body; a link arm pivotally supported by a shaft portion of the protector base; a harness holder pivotally connected to an end portion of the link arm; and a wire harness which is laid from one end of the protector base to the harness holder so as to be bent in a substantial S-shape, and laid from the harness holder to the other of the sliding structural body and the stationary structural body so as to be moved therebetween.

Due to the above structure, for example, in the case where the protector base is longitudinally arranged in the sliding structural body, in accordance with the opening and closing movement of the sliding structural body, the link arm is rotated and the harness holder is rotated in the same direction as that of the link arm or in the opposite direction to that of the link arm. While the wire harness is being rotated integrally together with the harness holder, a shape of the wire harness is changed from a substantial S-shape to a substantial deformed S-shape along the protector base, that is, when the sliding structural body is completely closed, the wire harness is extended and when the sliding structural body is opened half or completely opened, the wire harness is compressed. A substantially S-shaped bent wire harness portion located along the protector base elastically pushes the harness holder in a direction at the time of compression so that a redundant length of the wire harness can be absorbed. By the rotation of the link arm and the harness holder, the wire harness can be laid from the harness holder to the stationary structural body by the shortest distance at the time of opening and closing the sliding structural body.

Preferably, when the sliding structural body is closed, the wire harness is laid being formed into the substantial S-shape by a straight portion along the one end of the protector base, a first curved portion laid in a periphery of the shaft portion of the protector base succeeding to the straight portion, and a second curved portion, which crosses the link arm and extends to the harness holder, succeeding to the first curved portion, the second curved portion being reversely curved with respect to the first curved portion.

Due to the above constitution, the wire harness composes a substantially S-shaped bent portion by the straight portion, the downward curved portion and the upward curved portion. The operational effect of the present invention described above can be positively exhibited by this bent shape.

Preferably, the link arm is pushed by an elastic member in a direction in which a redundant length of the harness is absorbed, and the elastic member is a torsion coil spring arranged around the shaft portion of the protector base.

Preferably, a pair of guide walls parallel to each other is arranged on the one end of the protector base to form the straight portion of the wire harness.

Due to the above constitution, the torsion coil spring pushes the link arm in a direction so that a redundant length of the wire harness can be absorbed and hanging of the wire harness is prevented when the sliding structural body is opened half. One end of the torsion coil spring is engaged with (supported by) the link arm and the other end of the torsion coil spring is engaged (supported by) with the protector base. When a substantially S-shaped bent portion of the wire harness located along the protector base pushes the harness holder in a direction of absorbing a redundant length of the wire harness at the time of compression, a pushing force of the link arm generated by the elastic member is assisted when the sliding structural body is opened half. Therefore, the redundant length of the harness can be smoothly absorbed.

According to the above configurations, when the wire harness is laid along the protector base being formed into a substantial S-shape, a space on the surface side of the protector base is effectively put into practical use. Therefore, the feeding structure can be made compact. Since the wire harness is extended and contracted into a substantial S-shape, a redundant length of the wire harness is smoothly absorbed when the sliding structural body is opened half. Since the wire harness is smoothly bent into a substantial S-shape, stress concentration in the wire harness, which is caused in the conventional structure, can be evaded, so that the bending durability of the wire harness can be enhanced. Since the substantially S-shaped bent wire harness pushes the harness holder by a repulsion force in a direction so that a redundant length of the wire harness can be absorbed when the sliding structural body is opened half, the performance of absorbing the redundant length of the wire harness is enhanced. The wire harness is laid in the stationary structural body at the shortest distance from the harness holder. Therefore, the weight of the wire harness can be decreased and the manufacturing cost can be reduced.

According to the above configurations, the wire harness is formed into a substantially S-shaped bent portion including a straight portion, a downward curved portion and a upward curved portion. The advantages of the invention described above can be more positively exhibited by this bent portion.

According to the above configurations, when the torsion coil spring is used, as compared with the conventional leaf spring, the occupied space can be reduced and further the structure can be made thin. Therefore, the feeding structure of can be made compact. Further, the substantial S-shaped bent wire harness pushes the harness holder by a repulsion force in a direction so that a redundant length of the wire harness can be absorbed when the sliding structure is opened half. Accordingly, the performance of absorbing the redundant length of the wire harness by the elastic member can be more enhanced.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Figure 1:
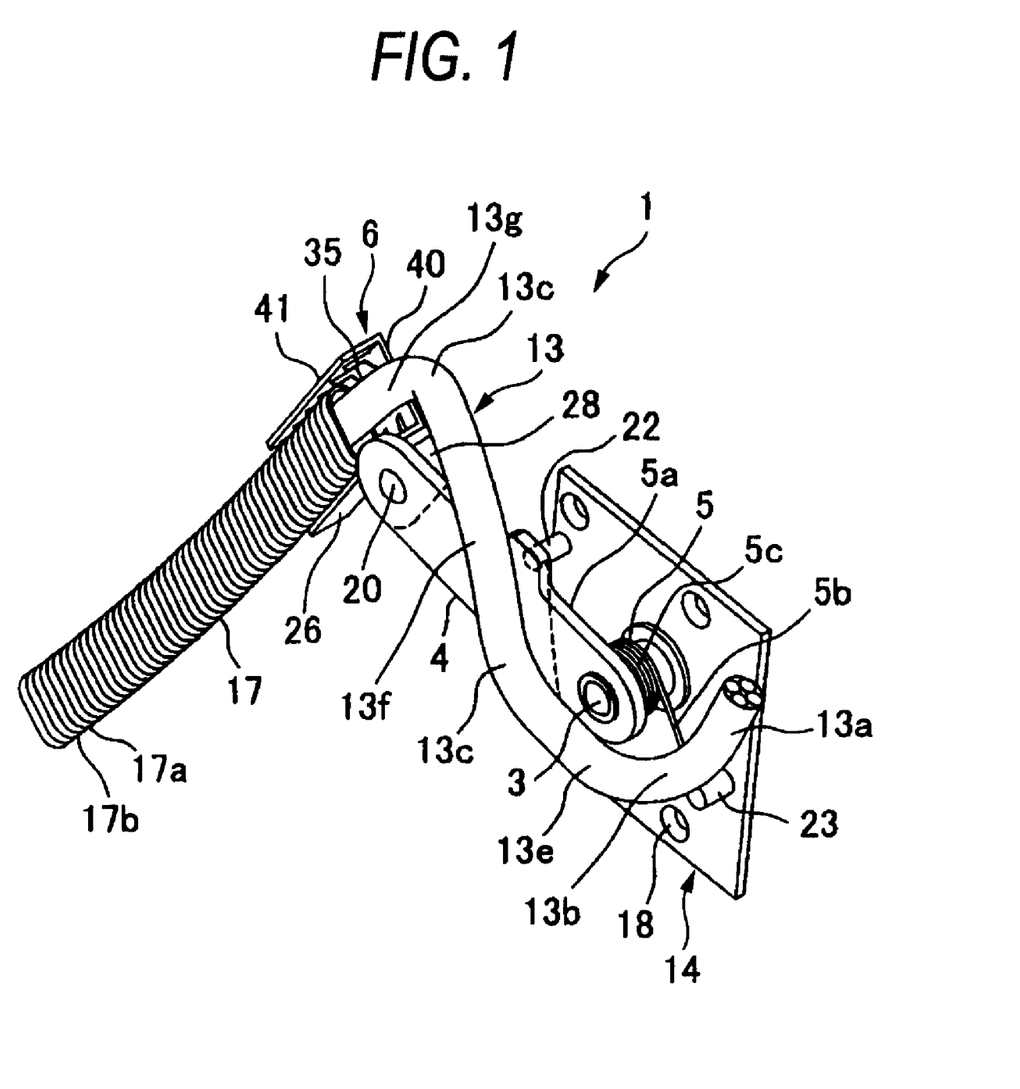
FIG. 1 is a perspective view showing an embodiment of the feeding structure for a sliding structural body of an embodiment of the present invention.
Figure 2:
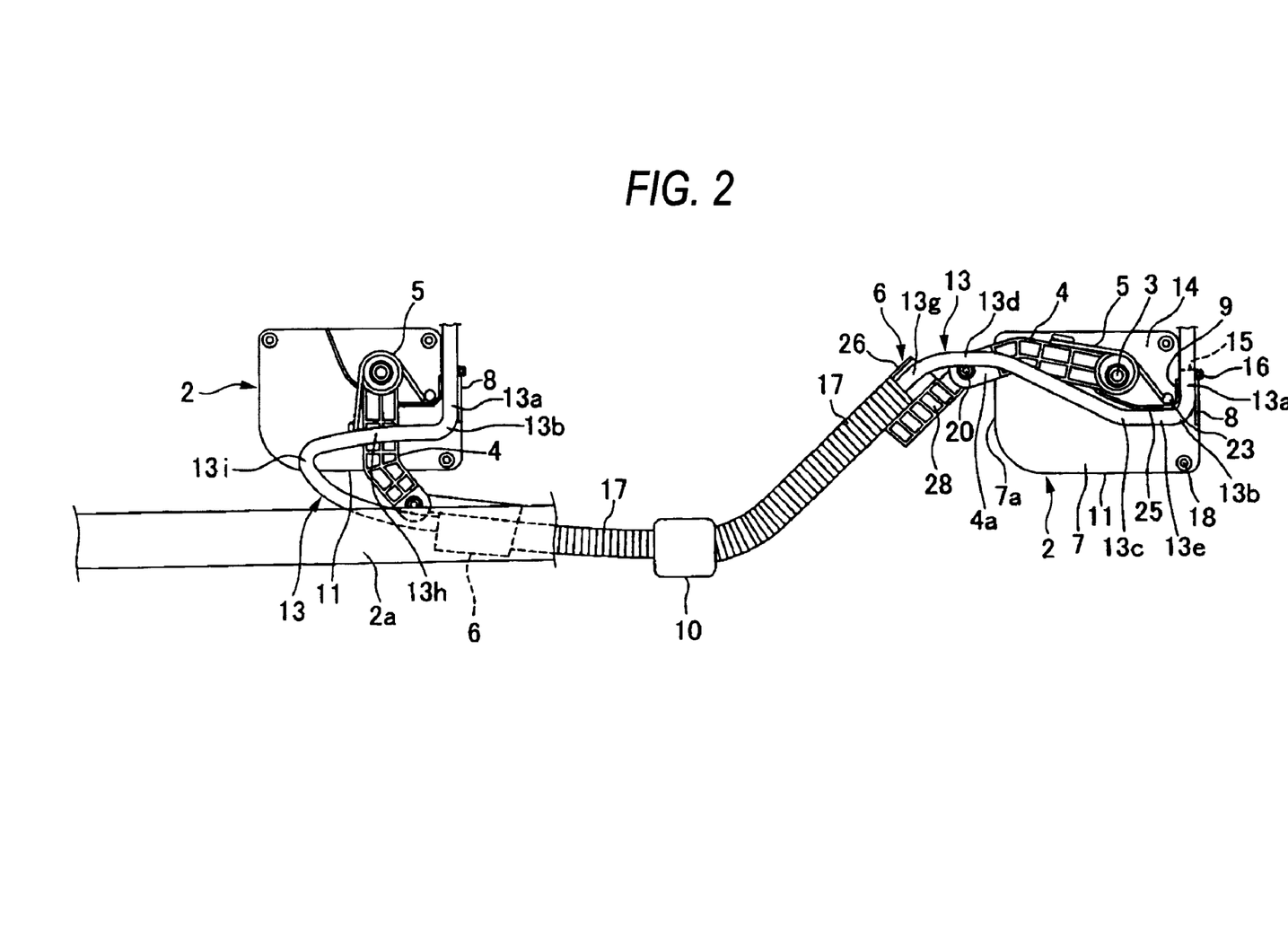
FIG. 2 is a front view showing a feeding structure for a sliding structural body acting at the time of complete closing (the right view) of the slide door and at the time of complete opening (the left view) of the slide door.
Figure 3:
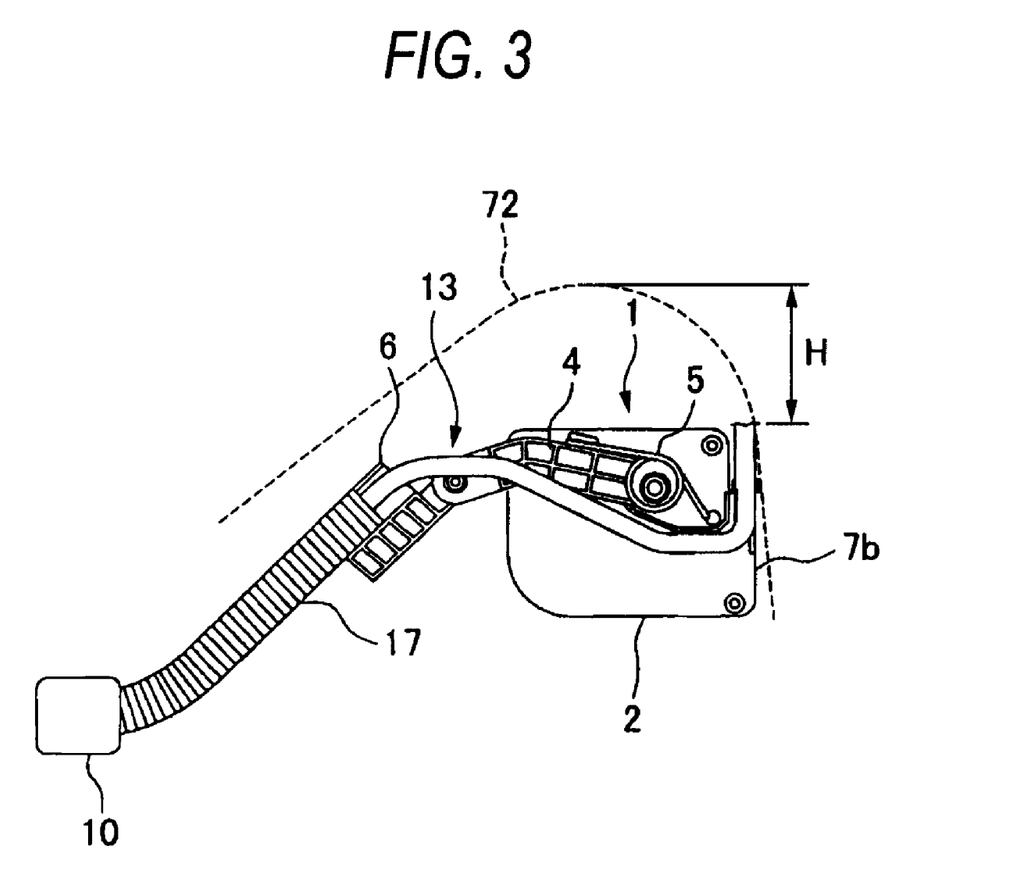
FIG. 3 is a front view showing a comparison between dimensions of the feeding structure for a sliding structural body according to the embodiment of the present invention and dimensions of the feeding structure for a sliding structural body of the related art.

FIGS. 1 to 3 are views showing an embodiment of the feeding structure for a sliding structural body of the present invention. In FIG. 2, for the convenience of explanations, operation states of the feeding unit at the time of opening and closing the sliding structural body are respectively shown by solid lines.

As shown in FIG. 1, this feeding structure includes: a protector base 2 (shown in FIG. 2) made of synthetic resin vertically (longitudinally) mounted on a slide door (a sliding structural body) of an automobile; one link arm 4 made of synthetic resin, the shaft portion 3 on the base portion side of the link arm being pivotally supported by the protector base 2; a torsion coil spring (an elastic member) 5 made of metal for pushing the link arm 4 upward; a harness holder 6 made of synthetic resin pivotally connected to a forward end portion of the link arm 4; and a wire harness 13 which is laid from the forward end side of the protector base 2 to the harness holder 6, while the wire harness 13 is crossing the link arm 4, being bent into a substantial S-shape. The feeding structure 1 includes at least the protector base 2 (shown in FIG. 2), the link arm 4, the harness holder 6 and the torsion coil spring 5.

As shown in FIGS. 1 and 2, the protector base 2 of the present embodiment includes: a wide rectangular large board 7, the width of which is long in the lateral direction; and a narrow small board 14, which is a different body from the large board 7, fixed at an right upper portion of the large board 7. The large board 7 includes wall portions 8, 9, which are provided on the front end side vertically in parallel with each other, from which the harness is guided out. At least a lower end portion of the large board 7 and the front and rear lower portions thereof are open being formed into a rectangle. That is, a rectangular opening 11 is formed.

In this connection, it is possible to provide a stopper wall (not shown) for stopping the link arm 4 at an upper end portion of the small board 14 and others. It is also possible to integrally form the large board 11 and the small board 14 out of synthetic resin. It is also possible to form a protector base by using only the small board 14. The directions of before and behind and the directions of up and down described in this specification indicate those of a vehicle.

The hole portion 18 of the protector base 2 is fixed onto a slide door panel by a bolt (not shown). The protector cover 2a is arranged inside of the vehicle being opposed to a lower end portion of the protector base 2. The protector base 2 and the protector cover 2a compose a protector. A longitudinal cross section of the protector cover 2a of the present embodiment is formed into a curved shape. The protector cover 2a is used as a harness guide and smoothly guides the wire harness 13 on the vehicle body side. In the case of not using the protector cover, the harness guide (2a), which is a different member, can be arranged on the slide door side. Alternatively, a door trim (not shown), for example, made of synthetic resin can be used as a protector cover.

The link arm 4 and the harness holder 6 are pivotally arranged along the protector base 2. From the rectangular opening 11 on the lower portion side of the protector base 2 through the protector cover, the wire harness 13 is laid on the vehicle body (the stationary structural body) side being capable of moving in the longitudinal direction.

The shaft portion 3 is arranged being protruded from the small board 14 of the protector base 2. The link arm 4 is pivotally arranged in the shaft portion 3. On an outer circumferential side of the shaft portion 3, the torsion coil spring 5 is arranged. Onto the small board 14, the link arm 4 and the torsion coil spring 5 are assembled while an installation space is being saved. In this way, the feeding unit primary portion is composed. It is possible to enhance the mechanical strength when only the small board 14 is made of metal.

Being adjacent to a front end portion of the small board 14, the harness outlet 15 (shown in FIG. 2) is provided upward between the harness guide walls 8, 9 in the large board 7. Between both guide walls 8, 9, the vertical portion (the straight portion) 13a of the electric wire portion (substituted by reference mark 13) of the wire harness 13 is inserted and fixed to the frame portion (the harness fixing portion) 16, which has a band insertion hole, outside the harness outlet 15 by a tie band (not shown). It is preferable that the guide wall 25 (shown in FIG. 2) for preventing the wire harness 13 and the torsion coil spring 5 from interfering with each other is vertically provided on a surface of the large board 7 in a boundary between the small board 14 and the large board 7.

The electric wire portion (substituted by reference mark 13) of the wire harness 13 is smoothly bent backward from the vertical portion 13a (In this case, a backward bending point is represented by reference mark 13b.) and formed into the downward curved portion 13e. Next, the electric wire portion of the wire harness 13 is smoothly bent upward (In this case, an upward bending point is represented by reference mark 13c.) and passes through a surface side of the intermediate portion in the longitudinal direction of the link arm 4, that is, the electric wire portion of the wire harness 13 crosses an intermediate portion in the longitudinal direction and is smoothly bent downward to a base end portion of the harness holder 6 so as to form an upward curved portion 13d. As shown in FIGS. 1 and 2, the upward curved portion 13d is reversely curved with respect to the downward curved portion 13e. In this way, the entire electric wire portion of the wire harness 13 is smoothly bent into a substantial S-shape. In this connection, by not using the surface side of the link arm 4 but by using the back side of the link arm 4, the wire harness 13 can be inserted between the link arm 4 and the protector base 2.

The corrugated tube 17 made of synthetic resin is fixed to the harness holder 6. The electric wire portion is inserted into the corrugated tube 17. The corrugated tube 17 is an existing flexible bellows-typed harness protecting tube in which the recess grooves 17a in the circumferential direction and the protrusions 17b are alternatively arranged in the longitudinal direction of the tube. In the present embodiment, the corrugated tube, the cross section of which is elliptical (a flat type), is arranged in such a manner that the cross section is longitudinally arranged. The wire harness 13 includes the electric wire portion (a plurality of electric wires) and the corrugated tube 17. In order to prevent the electric wire portion from breaking up, it is preferable that a tape is partially winded round the electric wire portion or the electric wire portion is bundled by a band.

The link arm 4 has a hole portion, into which the shaft portion 3 is inserted, provided on the base end side. The link arm 4 is prevented from drawing out by a stop ring attached to the shaft portion 3. It is possible to compose in such a manner that the hole portion is surrounded by a short annular boss portion on the back side of the link arm 4 and a forward end portion of the boss portion is pivotally contacted with a surface of the small board 14.

Concerning the link arm 4 of the embodiment shown in FIG. 2, a rear end portion of the link arm 4 is bent downward being inclined. The link arm 4 in FIG. 2 is different from that in FIG. 1. The harness holder 6 is pivotally connected to the rear end portion of the link arm 4 by the shaft portion 20. A link arm assembled body includes the link arm 4 and the harness holder 6.

As shown in FIGS. 1 and 2, in an upper portion of the intermediate portion in the longitudinal direction on the back side of the link arm 4, the hook-shaped spring support piece (the supporting portion) 22, at which the protruding piece 5a of the rear portion of the torsion coil spring 5 is hooked, is protruded. On the small board 14 of the protector base 2, the column (the supporting portion) 23, at which the protruding piece 5b of the forward portion of the torsion coil spring 5 is hooked, is provided. The winding portion 5c at the center of the torsion coil spring 5 is inserted into an outer circumference of the shaft portion 3.

The harness holder 6 of the present embodiment includes: a tub-shaped portion 26, the cross section of which is formed into a C-shape by the bottom wall 40 and both side walls 41; and a rectangular plate portion (a second link arm) 28 which is integrally provided being offset onto one side of the tub-shaped portion 26. On an inner circumferential face of the tub-shaped portion 26, the rib 35 (shown in FIG. 1) engaged with the recess groove 17a of the corrugated tube 17 is formed. The rear end portion of the link arm 4 is pivotally supported by the shaft portion 20 through the plate portion 28. On the surface side or the back side of the plate portion 28 and the link arm 4, reinforcement ribs are provided.

The corrugated tube 17 may be fixed to the tub-shaped portion 26 in such a manner that a tape is wound round the harness holder 6 or the harness holder 6 is tightened by a band. Alternatively, the tub-shaped portion 26 may be covered with a holder cover not shown so as to hold the corrugated tube 17 inside. In this case, the harness holder 6, the cross section of which is a C-shape, is referred to as a holder base.

Since the tub-shaped portion 26 is arranged being adjacent to the plate portion 28, the wire harness 13 arranged in the tub-shaped portion 26 is laid being offset from the shaft portion 20. Therefore, the bent portion 13d on the upper side of the electric wire portion of the wire harness 13 is separate from the shaft portion 20 and the wire harness is laid by a large radius of curvature of bend. Accordingly, bending stress given to the electric wire portion is reduced.

In FIG. 1, the wire harness 13 is laid being formed into a substantial S-shape. Therefore, the harness portion 13a vertical (straight) along a front end portion of the protector base 2 is laid downward. In a space on the lower side of the shaft portion 3 of the link arm 4, the harness portion (the downward curved portion) 13e is laid being curved downward along the periphery of the shaft portion 3. The harness portion 13f crosses the link arm 4 and is laid being protruded at the same height as that of the shaft portion 3 or at the height higher than that. The harness portion 13g is laid in the harness holder 6 being bent downward. Due to the above structure, a space on the surface side of the protector base 2 (shown in FIG. 2) is effectively put into practical use and the feeding structure is made compact.

In FIG. 2, the right side view shows a state in which a slide door on the left side of a vehicle is moved forward and completely closed. The left side view shows a state in which the slide door is moved backward and completely opened.

When the sliding door is completely closed, the link arm 4 resists a drawing force to draw the wire harness 13 backward and is pushed upward and located in a substantially horizontal state being pushed upward by the torsion coil spring 5 at the fulcrum of the front side shaft portion 3. The harness holder 6 is rotated to a little lower position than the forward end portion 4a inclined downward of the link arm 4. The rear end portion of the link arm 4 and the harness holder 6 are protruded backward from the rear end portion 7a of the protector base 2.

The wire harness 13 is laid downward from the harness outlet 15 at the front end. The wire harness 13 is bent backward along a lower end of the small board 14, that is, along the guide wall 25 and formed into the downward curved portion 13e directed downward. The wire harness 13 is laid upward along an intermediate portion in the height direction of the protector base 2 and crosses the link arm 4 and is laid being formed gently-sloping upward so as to form the upward curved portion 13d. The skirt portion 13g at the rear of the upward curved portion 13d continues to the harness holder 6 side. As described above, the wire harness 13 is laid being formed into a substantial S-shape along the protector base 2 and the link arm 4.

In the case of FIG. 1, since the straight link arm 4 is used, the upward curved portion 13d of the wire harness 13, which is directed upward, is located at a position higher than that shown in FIG. 2 and further the guide wall 25 (shown in FIG. 2) is not used. Accordingly, the downward curved portion 13e of the wire harness 13, which is directed downward, is formed into a smooth arcuate shape. In FIG. 2, it is possible to form the guide wall 25 into an arcuate shape and smoothly bend the backward bending point 13b of the wire harness 13.

In FIG. 2, the corrugated tube 17, one end of which is fixed to the harness holder 6, is laid being extended to the existing harness fixture 10 provided on the vehicle body side. This harness fixture 10 is also referred to as a rotary clamp and holds the corrugated tube 17 so that the corrugated tube 17 can be rotated in the circumferential direction and absorb the torsion. An electric wire portion inserted into the corrugated tube is connected to the wire harness (not shown) on the vehicle body side in the neighborhood of the harness fixture 10 by means of a connector. The electric wire portion guided out upward from the harness outlet 15 of the protector base 2 is connected to an auxiliary device on the slide door side by means of a connector.

When the slide door is opened from the completely closed state shown in the right view of FIG. 2, the wire harness 13 is urged to hung down between the slide door and the vehicle body (in the extending space) at the time of half-opening of the sliding door. However, by a pushing force of the torsion coil spring 5, the link arm 4 is rotated upward clockwise and a redundant length of the wire harness 13 is absorbed. At the rear end portion of the link arm 4, the harness holder 6 is rotated together with the wire harness 13 counterclockwise on the contrary to the link arm 4 and bending stress caused in the wire harness 13 in the corrugated portion 17 is reduced.

In the completely open state of the slide door shown in the left view of FIG. 2, the corrugated tube 17 is drawn forward at the fulcrum of the harness fixture 10 and rotated downward (counterclockwise) substantially vertically while the link arm 4 is resisting a pushing force generated by the torsion coil spring 5 and the harness holder 6 is rotated forward counterclockwise by a larger angle than that of the link arm 4. A lower half portion of the link arm 4 and the harness holder 6 are protruded downward from the lower end (the lower opening) 11 of the protector base 2. The harness holder 6 is smoothly guided together with the wire harness 13 along an inner face of the belt-shaped protector cover 2a which is long in the lateral direction.

The wire harness 13 is bent backward from the vertical portion (the straight portion) 13a along the guide wall 8 of the protector base 2. In this way, the bent portion 13b is formed. The wire harness 13 is laid substantially horizontally along the protector base 2 making a substantially right angle with an upper half portion of the link arm 4. In this way, the horizontal portion 13h is formed. The wire harness 13 is turned back being formed into a U-shape in a rear portion on the protector base 2. In this way, the turned back portion 13i is formed. Therefore, the wire harness 13 is formed into a substantially deformed S-shape and laid forward to the harness fixture 10 along the harness holder 6.

When the slide door is opened and closed, while the wire harness 13 is moving in the longitudinal direction at the fulcrum of the harness fixture 10, the wire harness 13 is extended and contracted being formed into a substantial S-shape along the protector base 2. That is, when the slide door is completely closed as shown in the right view of FIG. 2, the wire harness 13 is extended being formed into a substantial S-shape and when the slide door is completely opened as shown in the left view of FIG. 2, the wire harness 13 is compressed being formed into a substantially S-shape or a U-shape, that is, a substantially deformed S-shape. Due to the foregoing, the wire harness 13 generates a repulsion force to rotate the harness holder 6 clockwise (in a direction in which a redundant length of the wire harness 13 is absorbed) at the fulcrum of the wire harness fixing portion 16 located at a front end of the protector base 2. Therefore, at the time of half opening of the slide door, a redundant length of the wire harness can be smoothly, positively absorbed.

At the time of complete opening, complete closing or half opening of the slide door, by the rotation of the harness holder 6, the wire harness 13 is laid from the harness holder 6 to the harness fixture 10 by the shortest distance. Therefore, the overall length of the wire harness 13 is shortened compared with the conventional example shown in FIGS. 6A and 6B. Therefore, the manufacturing cost can be reduced and the weight can be decreased. Further, the electric wire can be easily inserted into the corrugated tube 17 at the time of insertion work of the electric wire.

FIG. 3 is a view in which the feeding unit 1 of the present embodiment which is in a state of complete opening of the slide door and the conventional feeding unit shown in FIG. 6 or the feeding unit similar to it are compared with each other in shapes.

In FIG. 3, the conventional leaf spring 73 (shown in FIG. 6A) is not used but the torsion coil spring 5 is used. The annular wall 80 for regulating a bend of the leaf spring of the conventional protector 72 (shown in FIG. 6A) is eliminated and the wire harness 13 is laid from the front end 7b of the protector base 2 to the harness holder 6 being formed into a substantial S-shape. Due to the above structure, a space located along the protector base 2 can be effectively put into practical use. Therefore, compared with the protector 72 of the conventional feeding unit, a height of the feeding unit of the present embodiment is greatly decreased. The decreased height is represented by reference mark H.

In the above embodiment, the present invention is applied to the slide door of an automobile. However, it is possible to apply the above feeding unit not only to the slide door of an automobile but also the slide structural body such as a slide door of a train, a slide door of a manufacturing apparatus or a slide door of an inspection apparatus. In this case, the vehicle body is referred to as a stationary structural body.

It is possible to arrange the protector base 2 not in the slide door (the sliding structural body) but in the vehicle body (the stationary structural body) and lay the corrugated tube 17 of the wire harness 13 at the harness fixing portion (10) on the slide door side in such a manner that the corrugated tube 17 can be moved. It is also possible to arrange the protector base 2 not vertically (longitudinally) with respect to the vehicle body but horizontally (laterally). Even in this case, the S-shape of the wire harness 13 is formed out of the horizontal straight portion 13a, the downward curved portion 13e and the upward curved portion 13d.

The above constitution is effective not only for the feeding structure for a sliding structural body but also for the harness laying structure for a sliding structural body and for the feeding unit for a sliding structural body.

What is claimed is:

1. A feeding structure for a sliding structural body, comprising:

a protector base arranged in one of the sliding structural body and a stationary structural body;

a link arm pivotally supported by a shaft portion of the protector base;

a harness holder pivotally connected to an end portion of the link arm; and a wire harness which is laid from one end of the protector base to the harness holder so as to be bent in a substantial S-shape, and laid from the harness holder to the other of the sliding structural body and the stationary structural body so as to be moved therebetween, wherein the wire harness is formed into the substantial S-shape by a first curved portion laid in a periphery of the shaft portion of the protector base and a second curved portion, which crosses the link arm and extends to the harness holder, succeeding to the first curved portion, the second curved portion being reversely curved with respect to the first curved portion, wherein the first curved portion is provided about the periphery of shaft portion extending outwardly from the link arm toward one side of the link arm, and the second curved portion extends about a periphery of the end portion of the link arm extending outwardly from the link arm toward another side of the link arm opposite the first side of the link arm, and wherein upon an opening/closing movement of the sliding structural body, curvatures of the first and second curved portions are changed while keeping the second curved portion reversely curved with respect to the first curved portion.

2. The feeding structure according to claim 1, wherein the substantial S-shape of the wire harness comprises a straight portion along the one end of the protector base, succeeding to the first curved portion at an end opposed to an end to which the second curved portion succeeds.

3. The feeding structure according to claim 1, wherein the link arm is pushed by an elastic member in a direction in which a redundant length of wire the harness is absorbed, and wherein the elastic member is a torsion coil spring arranged around the shaft portion of the protector base.

4. The feeding structure according to claim 2, wherein a pair of guide walls parallel to each other is arranged on the one end of the protector base to form the straight portion of the wire harness.

5. The feeding structure according to claim 1, wherein the link arm is pivotally supported by the shaft portion of the protector base at an end of the link arm opposite to the end portion at which the harness holder is connected.

6. The feeding structure according to claim 1, wherein the substantial S-shape of the wire harness is disposed between the protector base and the link arm.

7. The feeding structure according to claim 1, wherein the wire harness comprises an electric wire portion and a corrugated tube into which the electric wire portion is inserted, and wherein the harness holder engages the corrugated tube.

8. The feeding structure according to claim 1, wherein the wire harness extends through the harness holder at a position that is offset from a pivot point at which the harness holder pivots relative to the link arm.

9. The feeding structure according to claim 1, wherein the harness holder is pivotably connected to the link arm at a shaft portion of the link arm, and wherein the wire harness is separated from the shaft portion of the link arm.

* * * * *